(12) United States Patent
Okui (10) Patent No.: US 7,579,714 B2
(45) Date of Patent: Aug. 25, 2009

(54) UNINTERRUPTIBLE POWER SUPPLY APPARATUS

(75) Inventor: Yoshiaki Okui, Ueda (JP)

(73) Assignee: Sanyo Denki Co., Ltd., Tokyo (JP)

( * ) Notice: Subject to any disclaimer, the term of this patent is extended or adjusted under 35 U.S.C. 154(b) by 103 days.

(21) Appl. No.: 11/032,096

(22) Filed: Jan. 11, 2005

(65) Prior Publication Data

US 2006/0125448 A1 Jun. 15, 2006

(30) Foreign Application Priority Data

Dec. 10, 2004 (JP) .............................. 2004-357748

(51) Int. Cl.
*H02J 9/00* (2006.01)
(52) U.S. Cl. ........................................ 307/64; 320/138
(58) Field of Classification Search ................ 320/138; 307/66, 64; 363/34, 37, 84, 95
See application file for complete search history.

(56) References Cited

U.S. PATENT DOCUMENTS

| | | | | |
|---|---|---|---|---|
| 5,612,580 | A * | 3/1997 | Janonis et al. | 307/64 |
| 5,629,642 | A * | 5/1997 | Yoshimura | 327/142 |
| 2003/0025397 | A1 * | 2/2003 | Young et al. | 307/64 |
| 2003/0048006 | A1 * | 3/2003 | Shelter et al. | 307/64 |
| 2005/0043859 | A1 * | 2/2005 | Tsai et al. | 700/286 |
| 2005/0286274 | A1 * | 12/2005 | Pfitzer et al. | 363/37 |

FOREIGN PATENT DOCUMENTS

| | | |
|---|---|---|
| JP | 05-260684 | 10/1993 |
| JP | 2000-139040 | 5/2000 |

* cited by examiner

*Primary Examiner*—Akm E Ullah
*Assistant Examiner*—Ramy Ramadan
(74) *Attorney, Agent, or Firm*—Antonelli, Terry, Stout & Kraus, LLP.

(57) ABSTRACT

An uninterruptible power supply apparatus, enabling to detect an interruption on a commercial power supply, with certainty, to be turned into a battery operation, but not due to a momentary voltage-drop, unnecessarily, comprises: a rectifier (REC) 210 for converting an AD power inputted from a commercial power supply 100 into a AC power; an inverter (INV) 220 for converting the DC electric power into a desired AC power, to be supplied to a load 300; a battery 230 connected between those; a controller circuit 250 for controlling those power converters; and further, an interruption detection circuit 260 made from a frequency detection circuit, as a means for detecting an abnormality on the AC power inputted from the commercial power supply, whereby detecting the interruption, without responding to the momentary voltage-drop, while the controller circuit has a limiter 253 for protecting the rectifier from overload when the momentary voltage-drop occurs.

15 Claims, 6 Drawing Sheets

UNINTERRUPTIBLE POWER SUPPLY APPARATUS

BACKGROUND OF THE INVENTION

The present invention relates to an uninterruptible power supply apparatus for supplying electricity to a load, through converting DC electric power, which is stored or accumulated within a battery in advance, into AC electric power by means of power conversion equipment, even when interruption occurs on a commercial electric power source, and in particular, it relates to an uninterruptible power supply apparatus of a type of constant inverter power supply method.

Conventionally, the uninterruptible power supply apparatus is provided for load equipments, which must be always supplied with stable AC power, without any interruption thereof even for a moment, such as, a computer, etc., for example, for the purpose of protecting such loads from abnormality of the commercial power source, including an interruption; i.e., fluctuation on an input of the commercial power supply. For this reason, a mission of the uninterruptible power supply apparatus comes to be large, in particular, as being an apparatus for supporting a highly information-oriented society in recent years.

Further, as such the uninterruptible power supply apparatus, there are already known the following two (2) methods; i.e., so-called a constant commercial power supply method, in which the DC power is converted into the AC power through starting an inverter when an interruption occurs or voltage of the commercial power input comes down, while the commercial power input is outputted as it is when the commercial power source is in normal conditions, thereby supplying electricity to the loads, continuously, and so-called a constant inverter power supply method, in which a rectifier and an inverter provided on an input side are always operating, to convert the AC input power into the DC power, being connected with a battery circuit through a DC circuit, and further the DC power is converted into a stable AC power. The former, as is already known in the following Patent Document 1, for example, since it provides the commercial input as an output power, as it is, when the commercial power source is stable in the condition thereof, then it can be manufactured to be relatively small and light in the sizes etc., and further cheaply, however on the other hand, since the output of the apparatus also fluctuates depending upon the fluctuation of the input, when the fluctuation on the commercial power source is relatively large; therefore, it has a drawback, in particular, the stability of an output thereof.

On the contrary thereto, with the uninterruptible power supply apparatus of the latter, i.e., of the constant inverter power supply method, as is already known in the following Patent Document 2, for example, since the inverter is always operating, therefore there is no problem in the stability of the output thereof, however since the power converters (i.e., the rectifier and the inverter) are always operating, the loss in the apparatus comes to be large, an efficiency of the apparatus is deteriorated, and it is further disadvantageous, also in an aspect of noises due to a cooling fan for discharging heat generated therein. Moreover, with the uninterruptible power supply apparatus of such the constant inverter power supply method, it is also disadvantageous (i.e., being large, heavy and expensive), in aspects of an outer configuration, mass and prices thereof, comparing to those of the constant commercial power supply method mentioned above. For this reason, it is urgently necessary, for the uninterruptible power supply apparatus of such the constant inverter power supply method, to be small in the sizes, light in the weight, and further to be low in the price thereof.

Further, the uninterruptible power supply apparatus of such the constant inverter power supply method comprises, in general, a power converter built up with a rectifier, which is connected to an AC commercial power source, for converting the commercial AC power into the DC power, a reverse power converter (i.e., an inverter) for converting the DC power into the desired AC power to be supplied to the loads, and a battery connected between those power converters. And, for detecting an interruption of the AC power inputted from the AC commercial power source, normally there is an interruption detecting circuit (such as, an input voltage determining circuit) inputting the voltage thereof. Furthermore, in addition to those mentioned above, there is provided a frequency detecting circuit for detecting a frequency of the commercial AC power inputted. And, within the uninterruptible power supply apparatus in relation to such the conventional arts as were mentioned above, while the interruption detection circuit always watches or detects the voltage of the commercial AC power inputted, and a controller portion determines or detects the interruption due to a decrease of the value down to a predetermined value (for example, down to 90% of the normal voltage), thereby exchanging the apparatus into a mode when interruption occurs (i.e., an interruption mode).

Patent Document 1: Japanese Patent Laying-Open No. Hei 5-260684 (1993); and

Patent Document 2: Japanese Patent Laying-Open No. 2000-139040 (2000).

By the way, troubles on the commercial power source include a momentary voltage drop, as well as, the interruption, etc. This momentary voltage drop is a phenomenon of lowering on voltage, which is generated for a short time, about 0.07 to 2 seconds, for example, when an accident or a damage occurs on a power-transmission line or cable due to the falling of a thunderbolt. On the other hand, the interruption is generated due to a reason of stoppage of power transmission since the damaged circuit is opened for protecting a power-transmission system, or an unprepared opening of a breaker at a power distribution facility or station. However, with such the conventional uninterruptible power supply apparatuses mentioned above, not only the interruption of the power, but also the momentary voltage drop, including as well, if any abnormality occurs on voltage of the AC input (for example, down to 90% of the normal voltage), it is determined to be the interrupt, thereby starting a battery operation. Thus, while detecting the voltage (or the frequency) of the commercial AC power inputted, and when the detected value comes out a standard value, then it is determined to be the interruption, to start the operation of the battery. For this reason, even in a case of the momentary voltage drop for a short time-period, if the value of detected voltage comes out the standard value, then the operation is started upon the battery.

In more details thereof, an averaged number of the whole country (Japan) of occurring the momentary voltage drops (i.e., voltage drop of 10% or more) per one (1) consumer is 12 times/year, but on the contrary thereto, the averaged number of the whole country (Japan) of actually occurring the interruption is only 0.5 time/year; however, with the conventional uninterruptible power supply apparatus, if that momentary voltage drop comes down to be 10% or more, then the operation is changed into the battery operation. For this reason, i.e., the uninterruptible power supply apparatus is changed into the battery operation, not only when the interruption occurs actually, but also when the momentary voltage drop occurs;

then, the number of times of conducting the battery operation per year comes to be large, and also the time-period thereof to be long. Also, even when an abnormality occurs on the commercial power source even one (1) time, an amount of discharge of the battery is large.

In this manner, according to the conventional arts, the apparatus conducts the battery operation, unnecessarily, even when the momentary voltage drop occurs, therefore, it gives ill influences upon a lifetime of the battery, and depending upon the cases, it needs a maintenance process, such as, checking on a location of the interruption in the power-transmission system, and further it may be causes to be large in the sizes, heavy in the weight, and expensive in the prices of the apparatus.

BRIEF SUMMARY OF THE INVENTION

Then, an object is, according to the present invention, by taking such the problems or drawbacks of the conventional arts mentioned above into the consideration thereof, i.e., to provide an uninterruptible power supply apparatus, enabling to conduct the battery operation when detecting an interruption on the commercial power source, with certainty, but without conducting the battery operation, unnecessarily, due to such the momentary voltage drop.

For accomplishing such the object mentioned above, according to the present invention, first there is provided an uninterruptible power supply apparatus, comprising: a first power converter for converting an AC electric power inputted from a commercial power source into a DC electric power; a second power converter for converting said DC electric power into a desired AC electric power, to be supplied to a load; a battery connected between said first power converter and said second power converter; a means for detecting an abnormality on said AC electric power inputted from said commercial power source; and a controller portion for controlling said first power converter and said second power converter, wherein said abnormality detecting means inputs a frequency of the AC electric power inputted from said commercial power source, whereby detecting an interruption upon basis of lowering of the frequency of said AC electric power.

Also, according to the present invention, in the uninterruptible power supply apparatus as described in the above, preferably, said controller portion comprises a means for limiting an increase of current within said first power converter accompanying with lowering of voltage of the AC electric power inputted from said commercial power source.

Further, according to the present invention, also for accomplishing such the object mentioned above, there is also provided an uninterruptible power supply apparatus, comprising: a first power converter for converting an AC electric power inputted from a commercial power source into a DC electric power; a second power converter for converting said DC electric power into a desired AC electric power, to be supplied to a load; a battery connected between said first power converter and said second power converter; a means for detecting an abnormality on said AC electric power inputted from said commercial power source; and a controller portion for controlling said first power converter and said second power converter, wherein said controller portion further comprises a means for limiting an increase of current within said first power converter accompanying with lowering of voltage of the AC electric power inputted from said commercial power source.

Also, according to the present invention, in the uninterruptible power supply apparatus as described in the above, preferably, said current limiting means of said controller portion limits the current within a range of capacity of a rectifier, which builds up said first power converter for converting the AC electric power inputted from said commercial power source into the DC electric power.

In addition to the above, according to the present invention, also for accomplishing such the object mentioned above, there is further provided an uninterruptible power supply apparatus, comprising: a first power converter for converting an AD electric power inputted from a commercial power source into a DC electric power; a second power converter for converting said DC electric power into a desired AC electric power, to be supplied to a load; a battery connected between said first power converter and said second power converter; a means for detecting an abnormality on said AC electric power inputted from said commercial power source; and a controller portion for controlling said first power converter and said second power converter, wherein said abnormality detecting means detects an interruption, without responding to a momentary voltage-drop on the AC electric power inputted from said commercial power source.

BRIEF DESCRIPTION OF THE SEVERAL VIEWS OF THE DRAWING

Those and other objects, features and advantages of the present invention will become more readily apparent from the following detailed description when taken in conjunction with the accompanying drawings wherein:

FIGS. 5($a$) and 5($b$) are explanatory views for explaining the basic operation conditions of the uninterruptible power supply apparatus mentioned above;

FIGS. 7($a$) and 7($b$) are explanatory view for explaining the operation conditions of the uninterruptible power supply apparatus mentioned above, in particular, when an abnormality actually occurs on the power source.

DETAILED DESCRIPTION OF THE INVENTION

Hereinafter, embodiments according to the present invention will be fully explained by referring to the attached drawings.

Figure 1:
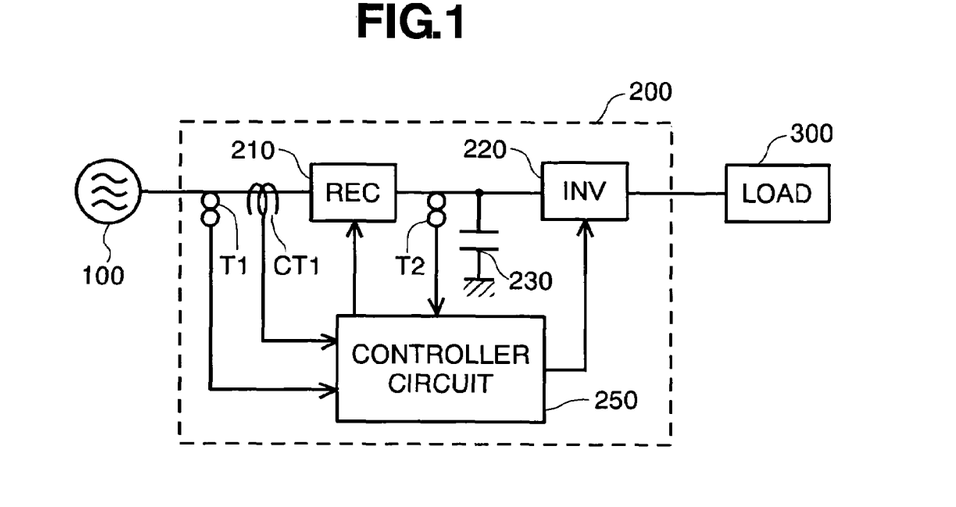
FIG. 1 is a system view of showing the entire structure of an uninterruptible power supply apparatus, according to one embodiment of the present invention.

FIG. 1 shows a circuitry block diagram for showing an outlook structure of an uninterruptible power supply apparatus, according to one embodiment of the present invention, wherein a reference numeral 100 in the figure depicts a commercial AC power-supply or source, and from this is supplied AC power of three (3) phases. However, in the figure, for easy explanation thereof, the AC powers of three (3) phases are shown by a line-connection of a single phase. Namely, the uninterruptible power supply apparatus 200 is connected to the commercial AC power supply 100, and it comprises a power converter, being made up with a rectifier (REC) 210 for converting the commercial AC power inputted into DC power, a reverse power converter, being made up with an inverter (INV) 220 for converting the DC power into desired AC power, to be supplied to a load, and a battery (or an accumulator) 230, being made up with, such as, a lead storage battery, for example, in the structure thereof. And, a reference numeral 250 in the figure depicts a controller circuit for controlling the power converters of the rectifier (REC) 210 and the inverter (INV) 220 mentioned above. Further, herein the load 300 mentioned above is load equipment, which are necessary to be supplied with stable AC power, but without interruption at any instance, such as, the computers, etc.

Also, a reference mark T1 in the figure depicts a frequency detection means, being made up from, such as, a potential transformer, for example, for detecting a frequency of the three-phase AC power supplied from the commercial AC power supply 100, T2 a voltage detection means made up also from a potential transformer, for example, for detecting DC output power ($V_{dc}$) from the rectifier (REC) 210 mentioned above, and further CT1 an input current measuring means, being made up from, such as, a current transformer, for example, for measuring current ($i_{ac}$) running into the uninterruptible power supply apparatus 200. However, the apparatus shown in this figure, as is apparent from the figure, builds up the uninterruptible power supply apparatus of the constant inverter supply method, wherein the AC input power is converted into the DC power through operating the rectifier 210 and the inverter 220, always, while being connected to the battery circuit through a DC circuit, and thereby converting the DC power into the stable AC power to be supplied to the load 300.

Figure 2:
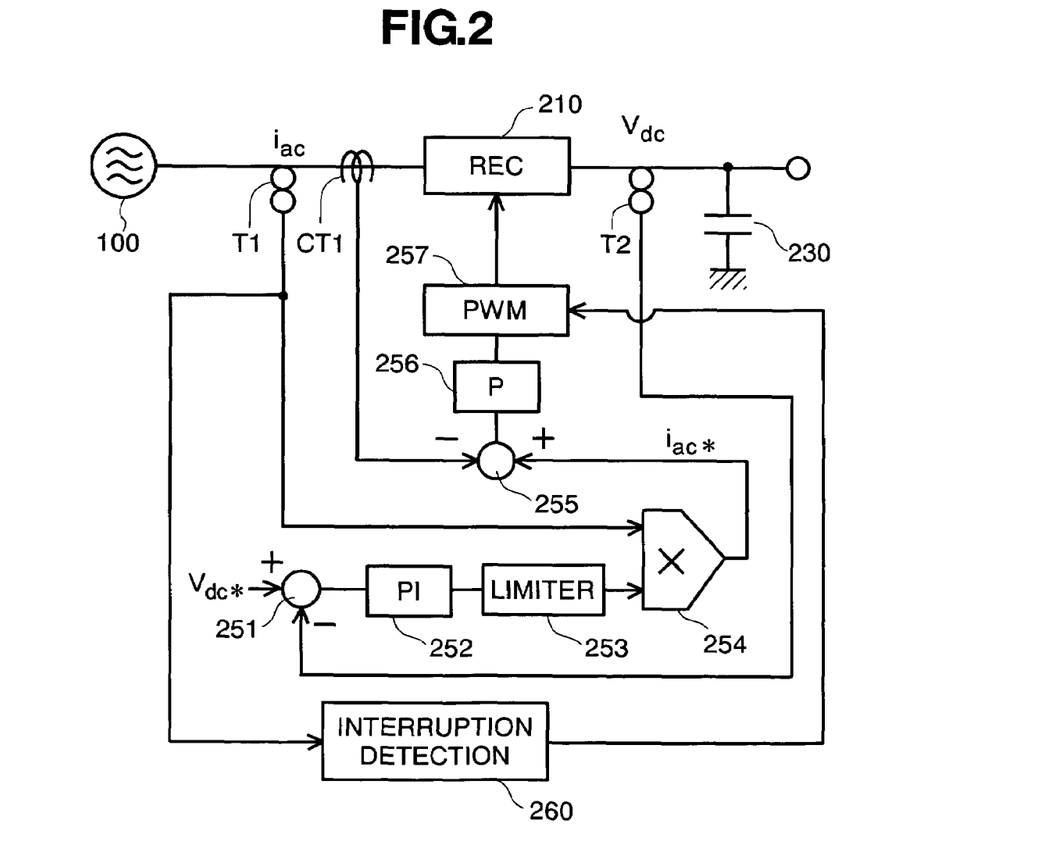
FIG. 2 is a circuit diagram for showing the details of a part, which is taken out from a controller circuit for controlling a rectifier (REC) and operation thereof, building up a feature in the uninterruptible power supply apparatus mentioned above.

Next, FIG. 2 attached herewith is a partial circuit diagram for showing the details of characterized portion of the uninterruptible power supply apparatus 200, the outlook structure of which was shown in FIG. 1 mentioned above, in particular, for explaining about the rectifier (REC) 210 and apart of the controller circuit 250 for controlling the operation of the rectifier, being taken out therefrom.

As is shown in FIG. 2, AC voltage detected by the potential transformer T1 mentioned above is inputted into an interruption circuit (or frequency abnormality detection circuit) 260, and within this, but not shown in the figure, a frequency is detected from the AC voltage inputted, so as to determine an interruption if it comes out or deviate from a predetermined value thereof. And, if the interruption is determined, then it stops a PWM circuit 257 in the operation thereof. Also, the AC voltage detected with this potential transformer T1 is also inputted into the controller circuit 250 mentioned above, thereby being inputted into a part of the controller circuit 250, the details of which will be mentioned later. And, the DC voltage ($V_{dc}$) detected by means of the potential transformer T2, and further the input current ($i_{ac}$) measured by the current transformer CT1 are also inputted into the controller circuit 250 mentioned above.

Also, the controller circuit 250 makes up a rectifying controller portion for controlling the operation of the rectifier (REC) 210 of the uninterruptible power supply apparatus 200, and this rectifying controller portion comprises, as is shown in FIG. 2, a subtractor 251 for comparing a preset voltage instruction value ($V_{dc}*$) to the DC voltage ($V_{dc}$) from the potential transformer T2 (i.e., being inputted with $V_{dc}*$ at a plus (+) input terminal while $V_{dc}$ at a minus (−) input terminal thereof). And, an output of this comparator 251 (i.e., $V_{dc}*-V_{dc}$) is inputted, through a PI circuit 252 for treating a proportional/integral processing thereupon and further a limiter 253, into an input terminal of a multiplier 254, on one side thereof. Into an input terminal on the other side of the multiplier 254 is inputted AC voltage, which is detected by the potential transformer T1. With this, a current instruction ($i_{ac}*$) is produced from the multiplier 254, and further, is compared to the input current ($i_{ac}$) measured by the current transformer CT1 within a subtractor 255 (i.e., inputted with $i_{ac}*$ at a plus (+) input terminal while $i_{ac}$ at a minus (−) input terminal thereof). An output of this subtrctor 255 (i.e., $i_{ac}*-i_{ac}$) is further led through a P circuit for executing the proportional process thereon into the PWM (Pulse Width Modulation) circuit 257, which controls the rectifier (REC) 210 mentioned above. Further, into this PWM circuit 257 is also led a frequency signal from the interruption detection circuit 260 of being made up with the frequency detection circuit, into which the signal measured by the potential transformer T1 is inputted.

Figure 3:
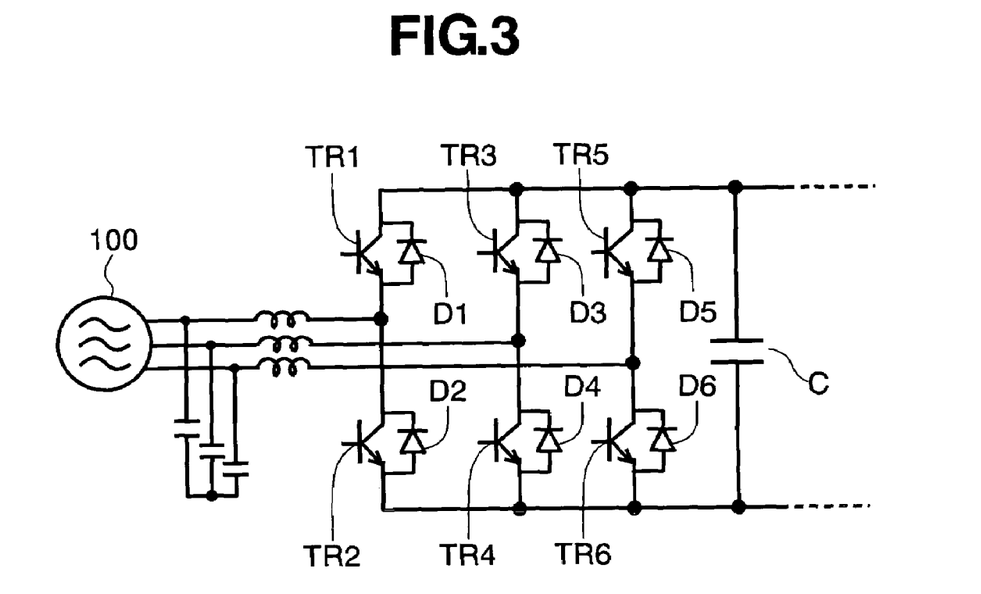
FIG. 3 is a circuit diagram for showing a concrete example of the rectifier (REC) of the uninterruptible power supply apparatus mentioned above.
Figure 4:
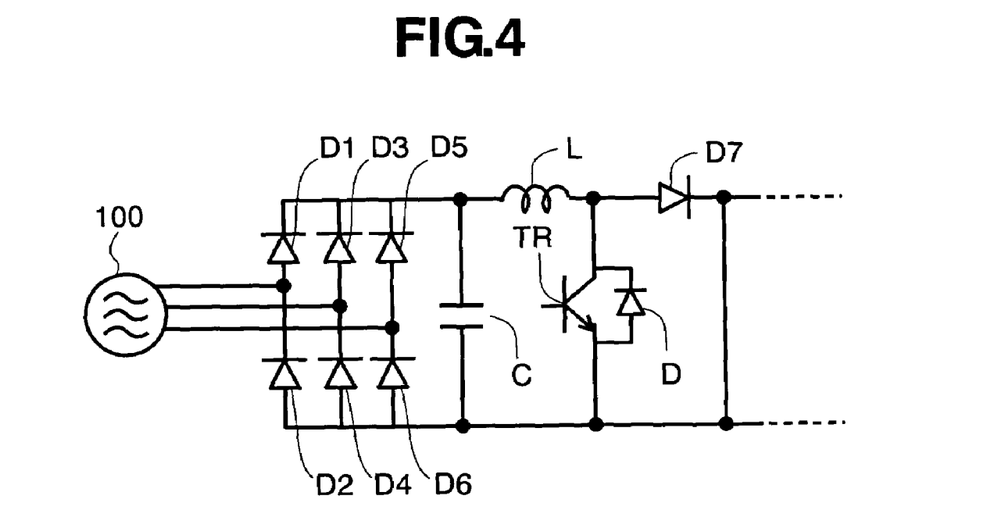
FIG. 4 is also a circuit diagram for showing other concrete example of the rectifier (REC) of the uninterruptible power supply apparatus mentioned above.

Further in FIG. 3 attached herewith is shown an example of the concrete structure of the rectifier (REC) 21, which is controlled by the PWM circuit 257 mentioned above. In this example, a bridge-circuit is built up with six (6) pieces of transistors TR1-TR6 including diode D1-D6, each being in reverse-parallel connection, respectively, for the purpose of converting the three-phase AC power into the DC power, and further comprising a smoothing capacitor C. Also, this rectifier (REC) 210 may be constructed with, as is shown in FIG. 4 in the place of that shown in FIG. 3 mentioned above; i.e., comprising, six (6) pieces of diodes D1-D6, a filter made up with a capacitor C and reactor L, and one (1) piece of transistor TR including a diode D in reverse-parallel connection therewith, for example. Furthermore, in the place of the transistor mentioned above, it is also possible to apply a transistor of voltage drive-type, such as, an IGBT, FET, etc., or a semiconductor switch of a current control element, such as, GTO or the like, for example. Although there is shown only the rectifier (REC) as being the converter for converting three-phase AC power into the DC power in the above, however, it is as a matter of course that a rectifier (REC) for converting two-phase AC power into the DC power may be applied in the place thereof.

Next, explanation will be given about the operation of the uninterruptible power supply apparatus 200, the detailed structure of which is shown in the above, in particular, the operation when a trouble (or an abnormality) occurs on the commercial power source or supply, including the momentary voltage-drop and the interruption, etc., by referring to FIGS. 5(a) and 5(b).

By the way, as was mentioned in the above, the nationwide average number of times when the momentary voltage-drop (i.e., the voltage drop by 10% or more) occurs per one consumer is twelve (12) times/year, but on the contrary to this, the nationwide average number of times when the interruption actually occurs is only 0.5 time/year. With the uninterruptible power supply apparatus according to the present invention, the operation thereof is changed completely into the battery operation, in the case of the interruption; however, when the momentary voltage-drop occurs, it generates an output up to the maximum current that the said rectifier can provide from, even if the voltage goes down on the input to the rectifier, while supplying a shortage thereof from the battery. Accordingly, even also when such the momentary voltage-drop occurs that the conventional uninterruptible power supply apparatus changes into the battery operation, no discharge is made from the battery if being within a range of an output capacity of the rectifier (i.e., since the rectifier uses the semiconductor switches, there is a limit value on the current, which can flow therein).

Figure 5A:
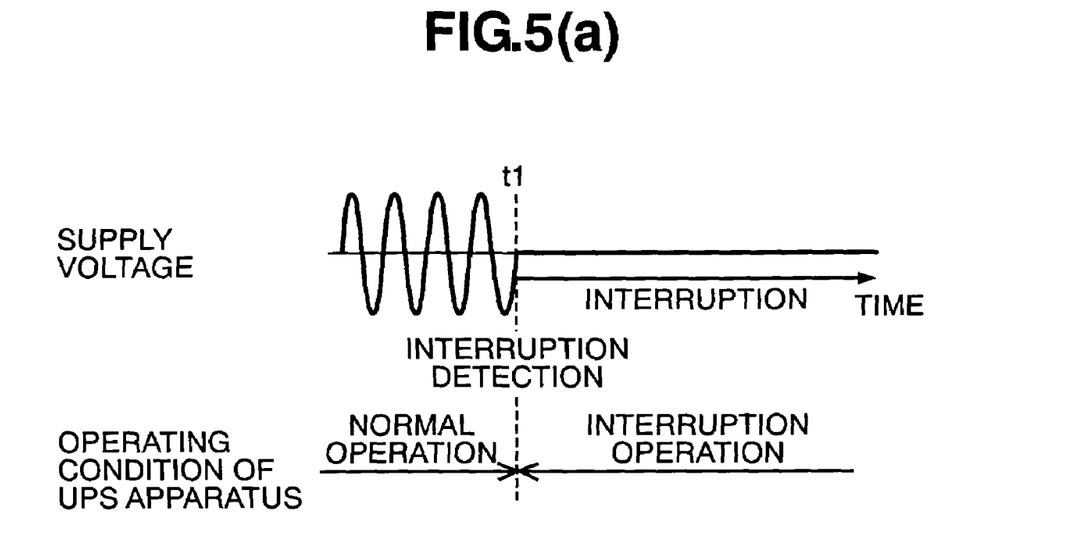
Figure 5B:
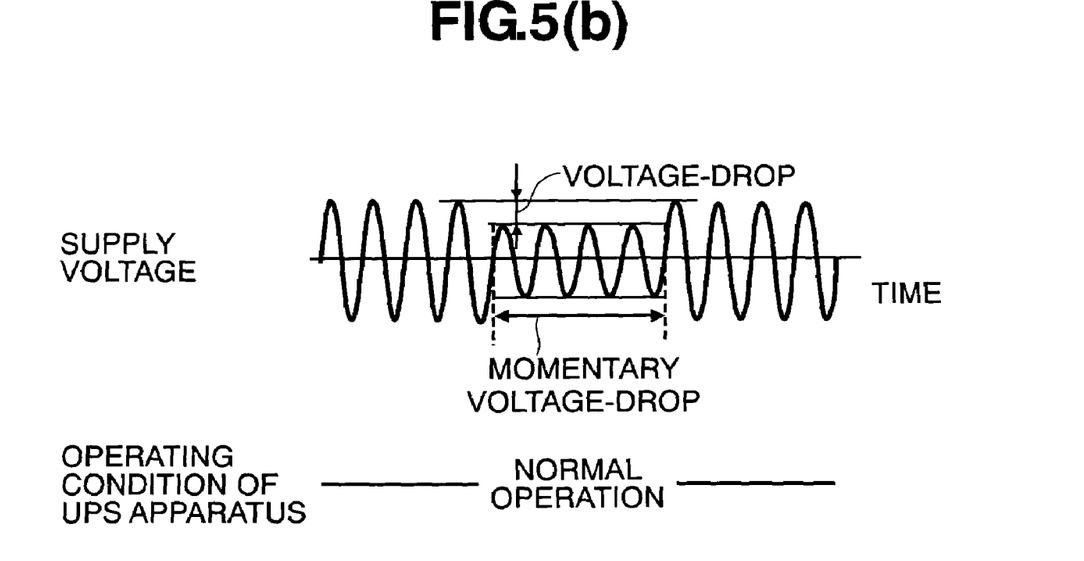

First of all, as is shown in FIG. 5(a), when the electric power supplied from the commercial power supply stops at time "t1" due to the interruption, then the interruption is detected on the commercial power supply, through processing executed by a CPU, etc., which builds up a portion of the controller circuit 250 mentioned above (i.e., the interruption on the commercial power supply is detected by means of the interruption detection circuit 260).

Figure 6:
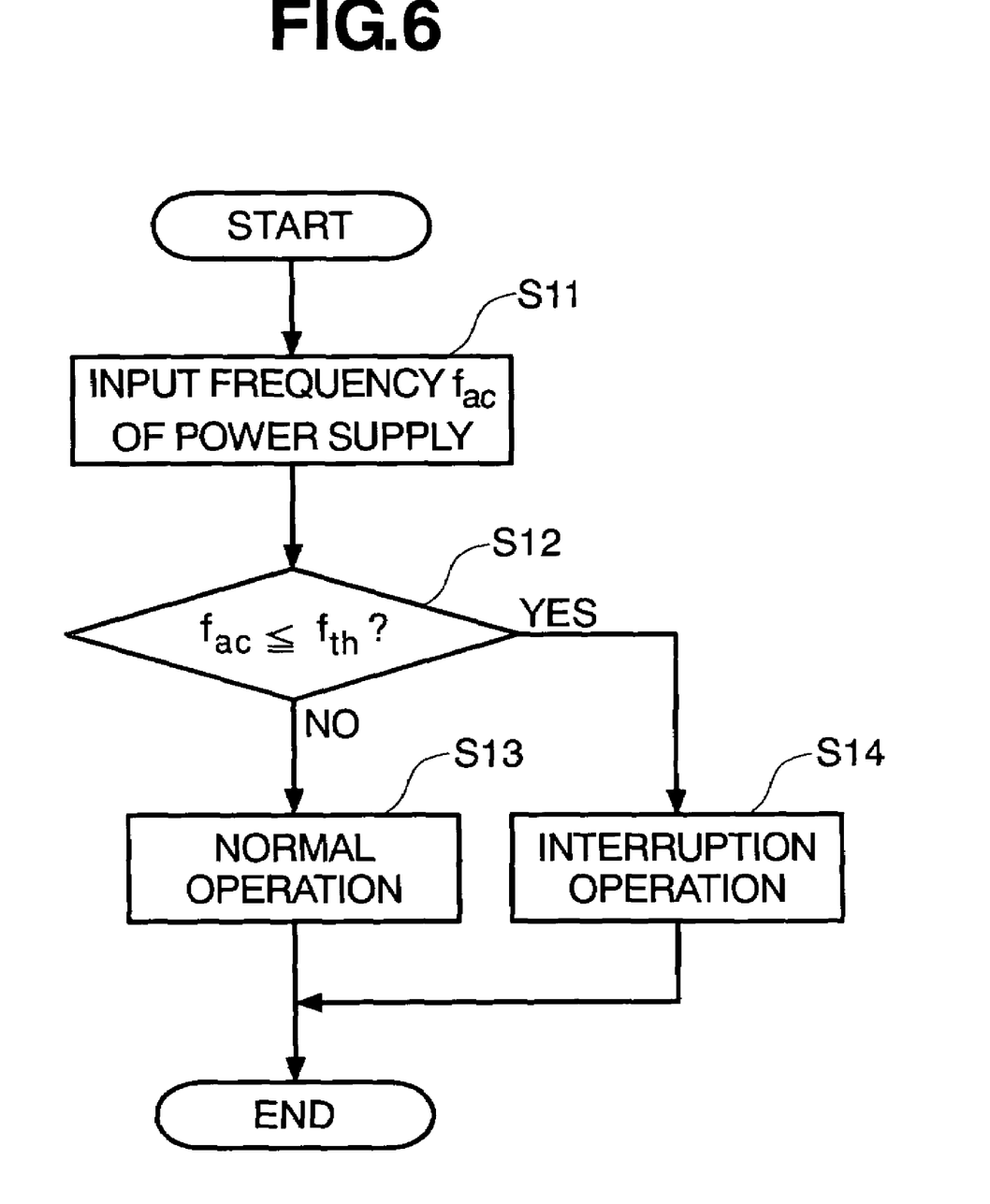
FIG. 6 is a flowchart for showing details of detection of the interruption within the uninterruptible power supply apparatus mentioned above.

Namely, as is shown in FIG. 6 attached herewith, when the process starts, first the frequency signal $f_{ac}$ detected is inputted from the interruption detection circuit 260 (step S11). Following to this, the frequency signal $f_{ac}$ inputted is compared to a predetermined value (i.e., a reference value $f_{th}$ of interruption frequency), which is memorized in a memory or the like, in advance (step S12). As a result, if being determined that it is equal to or less than the predetermined value ($f_{ac} \leq f_{th}$) (see "Yes" in the figure), then the uninterruptible power supply apparatus is changed into an interruption operation, and the process is ended. Namely, as is shown in FIG. 5(a), the uninterruptible power supply apparatus change the operation condition (or mode) from a normal operation into the interruption operation.

On the other hand, as a result of the determination mentioned above, if being determined that the frequency is greater than the predetermined value ($f_{ac} > f_{th}$) (see "No" in the figure), then the normal operation is continued, and the process is ended. Thus, as is shown in FIG. 5(b), the uninterruptible power supply apparatus continues while keeping the operation condition (or mode) to be the normal operation, irrespective of the momentary voltage-drop. However, herein the reference value $f_{th}$ of interruption frequency may be set at a value, for example, around 80-90% of the normal frequency of the commercial power supply; i.e., 50 Hz in Kanto-area (Eastern part of Japan) or 50 Hz in Kansai-area (Western part of Japan).

Figure 7A:
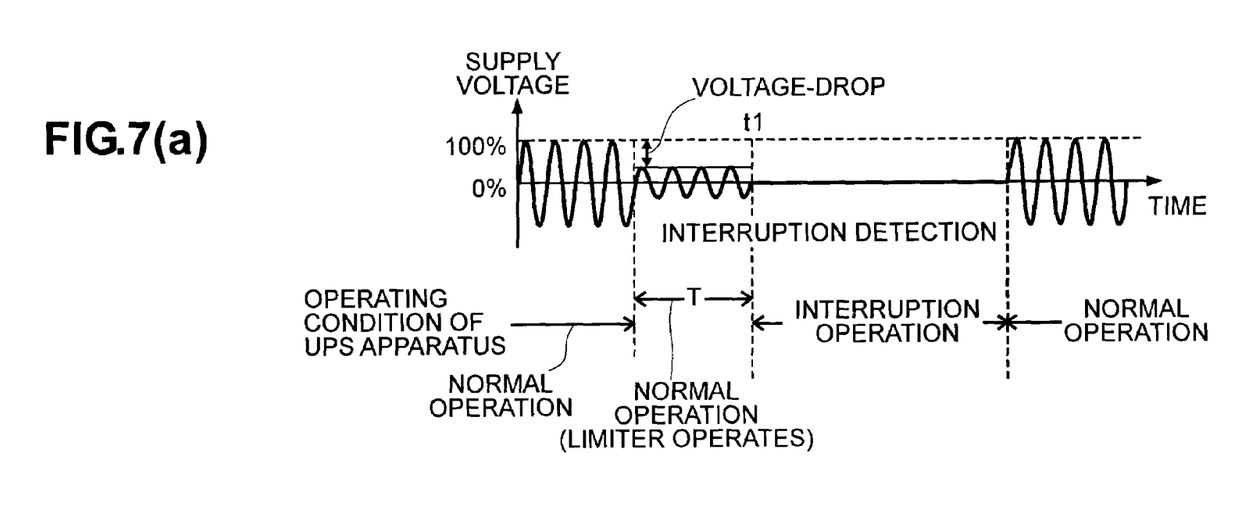

Next, explanation will be given about the operation when the trouble occurs on the commercial power supply, including the momentary voltage drop and/or the interruption, etc., in particular, under the condition of an actual application of the uninterruptible power supply apparatus, by referring to FIG. 7.

In general, the momentary voltage-drop is a phenomenon that the voltage goes down at a moment, and almost thereof is caused due to the falling of a thunderbolt onto a power transmission line or a power distribution wire. Namely, an abnormality is generated on the electric power system due to the falling of a thunderbolt onto the power transmission line, a large fault current flows into the direction of the trouble point during a time-period from when detecting that abnormality through a protection apparatus up to when cutting off that block or section by the function of a circuit breaker (for example, about 0.07 to 2 sec). For this reason, there occurs the voltage-drop, widely. The state or behavior of the power supply voltage when that momentary voltage-drop occurs is shown in FIG. 7(b).

On the other hand, the interruption is generated, when an accident occurs due to the falling of a thunderbolt onto the power transmission line, etc., building up the electric power system (almost thereof are caused by reverse breakdown due to the falling of a thunderbolt), for restricting damages on the facilities, and also for restraining the fluctuation on voltage and electric power down to the minimum, thereby maintaining the stability of the electric power system. In this instance, it is necessary to cut off the accident point from the electric power system; therefore, the accident is detected at high speed and it is cut off from the electric power system. However, the accident point can be detected by the function of a protection relay, which is provided for each facility, such as, the power transmission line, etc., and when an accident occurs, the circuit breakers automatically open, so as to cut off the accident block or section therefrom. And, during the time-period when that accident occurs up to when the accident point is cut off (i.e., about 0.07 to 2 sec), the momentary voltage-drop is generated. The state or behavior of the power supply voltage when that interruption occurs is shown in FIG. 7(a).

In this manner, under the actual condition of using the uninterruptible power supply apparatus, the momentary voltage-drop and the interruption mentioned above generate, mixing up together. For this reason, if trying to detect the interruption upon the basis of dropping of the supply voltage (for example, 10%-15% or more) as was proposed by the conventional art, not only the interruption, but also the momentary voltage-drop are also detected; thereby, conducting the battery operation thereof, unnecessarily.

On the contrary thereto, as was mentioned above, since the uninterruptible power supply apparatus according to the present invention, as was shown in FIG. 6 mentioned above, the interruption is detected, not the detection of lowering of the supply voltage, but upon the frequency of the power supply; therefore, it is possible to detect the interruption, with certainty, but without erroneous detection thereof due to the momentary voltage-drop (of during the time-period "T") (i.e., the frequency of the power source is kept within a predetermined region of frequency variation, even when that momentary voltage-drop occurs). Thus, as is shown in FIG. 7(a), the uninterruptible power supply apparatus, according to the present invention, continues the normal operation (i.e., not stopping the rectifier (REC)), even when the supply voltage goes down due to the ill influence of the momentary voltage-drop, and thereafter, it changes the operation mode thereof from the normal operation into the interruption operation at the time poing when the interruption occurs (at the time "t1". Further, when the power supply recovers thereafter (at the time "t2"), then it turns back into the normal operation, again (see the process S13 in FIG. 6 mentioned above).

Figure 7B:
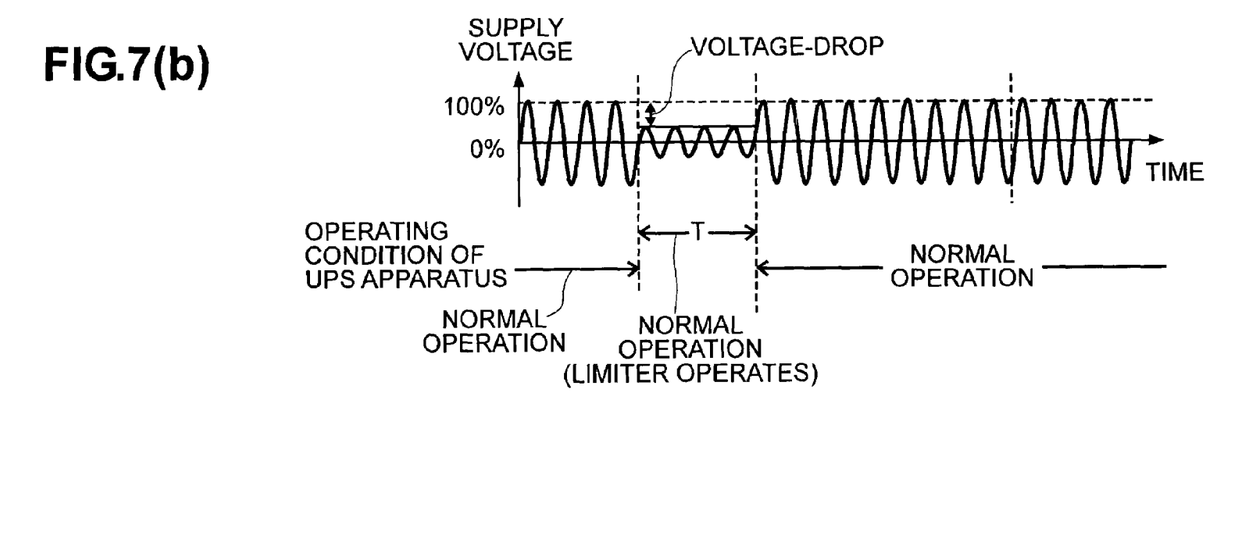

And, the uninterruptible power supply apparatus, according to the present invention, as shown in FIG. 7(b), operates as follows, when the momentary voltage-drop (of during the time-period "T") occurs, but no such the interruption occurs.

Thus, the uninterruptible power supply apparatus continues the normal operation, including the period "T" of generating the momentary voltage-drop, but without detecting the generation of the interruption, erroneously, due to the generation of the momentary voltage-drop. However, in that instance, in particular, the period "T" of generating that momentary voltage-drop, there can occur the case where the rectifier (REC) 210 must operate exceeding over an output capacity thereof. Namely, since the rectifier (REC) is controlled, in general, so that the DC power of the output therefrom comes to be constant (i.e., P=I×V=constant); therefore, the current flowing therein increases accompanying the momentary voltage-drop. Then, within the uninterruptible power supply apparatus, according to the present invention, in a part of the controller circuit 250 for controlling the rectifier (REC) 210, there is provided so-called the limiter 253, thereby protecting the rectifier (REC) 210 from being damaged due to such overload thereupon.

Herein, turning back to FIG. 2, again, the preset voltage instruction value ($V_{dc}*$) is compared to the DC voltage ($V_{dc}$) from the potential transformer T2, within the adder 251, and it is treated with the proportion/integration process within the PI circuit 252, however thereafter, it is restricted upon the value thereof by the function of the limiter 253. Thus, the current flowing through the semiconductor switches used within the rectifier, which is controlled through the PWM circuit 257, actually, depending upon current instruction ($i_{ac}$*) that is produced upon the basis of the output from the PI circuit 252, it is so controlled to be within a rated current thereof. With this, in the uninterruptible power supply apparatus, it is possible to protect that rectifier from the overload, which will generate during the momentary voltage-drop. In other words, the rectifier (REC) 210 provides the output thereof at the maximal limit of the rectifying capacity thereof during when the voltage is inputted. With doing this, comparing to the conventional art of stopping the rectifier when the momentary voltage-drop occurs, since the rectifier does not stop even when such the momentary voltage-drop occurs, and it provides the output up to the maximum thereof; therefore, the uninterruptible power supply apparatus according to the present invention, does not use or consume the battery, unnecessarily. Also, even in a case where the electric power required from the load side exceeds the output capacity of the rectifier, since the rectifier supplies the electric power as far as it can, therefore only a shortage thereof is discharged from the battery. Namely, in the case according to the present invention, even when the momentary voltage-drop exceeds over the capacity of the rectifier, only an amount of electric power, which the rectifier cannot output, is supplied from the battery supplies, only for the time-period during that momentary voltage-drop; therefore, it is possible to lessen the discharge amount of the battery per one (1) time when the abnormality occurs on the commercial power supply, thereby enabling to elongate the lifetime of the battery building up the uninterruptible power supply apparatus.

Although the lead storage battery was mentioned as to be the battery 230, in the detailed description mentioned above, however, in the place thereof, for example, a capacitor (including, an electrical double layer capacitor therein) may be applied, thereby obtaining a countermeasure only for the momentary voltage-drop. But, also in such the case, with the structure according to the present invention, the amount of electricity to be supplied from the capacitor is always small, and therefore, the said capacitor can be made small in the capacitance thereof, thereby enabling the sizes of the apparatus to be small as a whole. Furthermore, it is needless to say that other secondary batteries or cells also can be applied, in the similar manner as was mentioned above.

Figure 8:
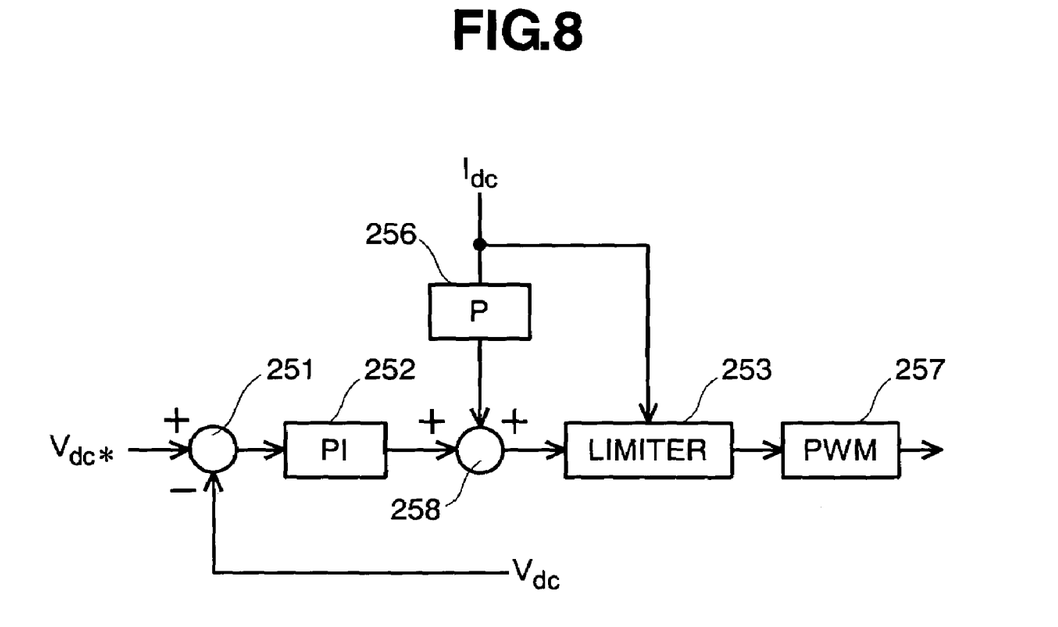
FIG. 8 is a circuit diagram for showing other example of the controller circuit for controlling the rectifier (REC) mentioned above.

Also, with the rectify control portion for controlling the rectifier (REC) 210, which is within the controller circuit 250 mentioned above, it should not be limited only to such the circuit structure shown in FIG. 2 mentioned above, and it may be made up with such the structure as shown in FIG. 8 attached. In the example of this circuit structure, the limiter 253 is provided between the adder 258 and the PWM circuit, however the function or operation thereof is same to that shown in the above.

As was mentioned fully in the above, according to the present invention, there can be achieved an extremely superior effect of providing an uninterruptible power supply apparatus, enabling to conduct the battery operation when detecting an interruption on the commercial power source, with certainty, but without conducting the battery operation, unnecessarily, due to such the momentary voltage drop.

The present invention may be embodied in other specific forms without departing from the spirit or essential feature or characteristics thereof. The present embodiment(s) is/are therefore to be considered in all respects as illustrative and not restrictive, the scope of the invention being indicated by the appended claims rather than by the forgoing description and range of equivalency of the claims are therefore to be embraces therein.

What is claimed is:

1. An uninterruptible power supply apparatus, comprising:
    a first power converter for converting an AC electric power inputted from a commercial power source into a DC electric power;
    a second power converter for converting said DC electric power into a desired AC electric power, to be supplied to a load;
    a storage means connected between said first power converter and said second power converter;
    a means including a potential transformer, for detecting an abnormality on said AC electric power inputted from said commercial power source, wherein said means for detecting determines said abnormality to be a complete power interruption or a temporary voltage drop based on a comparison of an input frequency of said AC electric power to a threshold frequency;
    a controller portion including a PWM circuit for controlling said first power converter, and for controlling said second power converter, wherein
    said abnormality detecting means inputs a frequency of the AC electric power inputted from said commercial power source through said potential transformer, whereby detecting an interruption if the frequency of the AC electric power deviates from a predetermined value,
    said controller portion continues to control said PWM circuit to let said first power converter supply current to said load based on an available input current from the commercial power source if said abnormality is determined to be the temporary voltage drop, and
    said controller portion stops said PWM circuit from controlling said second power converter thereby supplying current from said storage means to said load if said abnormality is determined to be the complete power interruption.

2. The uninterruptible power supply apparatus, as described in the claim 1, wherein said controller portion comprises a means for limiting an increase of current within said first power converter accompanying with lowering of voltage of the AC electric power inputted from said commercial power source.

3. The uninterruptible power supply apparatus, as described in the claim 2, wherein said first power converter comprises a rectifier, said controller portion comprises a PWM circuit for controlling said rectifier, and further said limiting means limits a value of an instruction signal inputted into said PWM circuit.

4. The uninterruptible power supply apparatus, as described in the claim 1, wherein said abnormality detecting means detects the interruption when the AC electric power inputted from said commercial power source down to about 80-90% in the frequency thereof.

5. The uninterruptible power supply apparatus, as described in the claim 1, wherein said storage means comprises a battery.

6. The uninterruptible power supply apparatus, as described in the claim 1, wherein said storage means comprises a capacitor.

7. An uninterruptible power supply apparatus, comprising:
    a first power converter for converting an AC electric power inputted from a commercial power source into a DC electric power;

a second power converter for converting said DC electric power into a desired AC electric power, to be supplied to a load;

a storage means connected between said first power converter and said second power converter;

a means including a potential transformer, for detecting an abnormality on said AC electric power inputted from said commercial power source and determining if said abnormality is a complete power interruption or temporary voltage drop based on only a frequency of the AC electric power; and a controller portion, including a PWM circuit, for controlling said first power converter, and for controlling said second power converter, wherein said controller portion continues to control said PWM circuit to let said first power converter supply current based on an available input current from the commercial power source if said abnormality is determined to be the temporary voltage drop wherein said controller portion stops said PWM circuit from controlling said second power converter thereby supplying current from said storage means to said load if said abnormality is determined to be the complete power interruption, and wherein said controller portion further comprises a means for limiting an increase of current within said first power converter accompanying with lowering of voltage of the AC electric power inputted from said commercial power source.

8. The uninterruptible power supply apparatus, as described in the claim 7, wherein said current limiting means of said controller portion limits the current within a range of capacity of a rectifier, which builds up said first power converter for converting the AC electric power inputted from said commercial power source into the DC electric power.

9. The uninterruptible power supply apparatus, as described in the claim 8, wherein said first power converter comprises a rectifier, said controller portion comprises a PWM circuit for controlling said rectifier, and further said limiting means limits a value of an instruction signal inputted into said PWM circuit.

10. The uninterruptible power supply apparatus, as described in the claim 7, wherein said abnormality detecting means detects the interruption when the AC electric power inputted from said commercial power source down to about 80-90% in the frequency thereof.

11. The uninterruptible power supply apparatus, as described in the claim 7, wherein said storage means comprises a battery.

12. The uninterruptible power supply apparatus, as described in the claim 7, wherein said storage means comprises a capacitor.

13. The uninterruptible power supply apparatus, as described in the claim 11, wherein said abnormality detecting means comprises a frequency detection circuit.

14. The uninterruptible power supply apparatus, as described in the claim 11, wherein said abnormality detecting means comprises a potential transformer.

15. The uninterruptible power supply apparatus, as described in the claim 11, wherein said abnormality detecting means detects the interruption when the AC electric power inputted from said commercial power source down to about 80-90% in the frequency thereof.

* * * * *

UNITED STATES PATENT AND TRADEMARK OFFICE
CERTIFICATE OF CORRECTION

PATENT NO. : 7,579,714 B2  Page 1 of 1
APPLICATION NO. : 11/032096
DATED : August 25, 2009
INVENTOR(S) : Yoshiaki Okui It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 132 days.

Signed and Sealed this

Fourteenth Day of September, 2010

David J. Kappos
*Director of the United States Patent and Trademark Office*